United States Patent
Abdelhalim et al.

(10) Patent No.: US 11,106,568 B2
(45) Date of Patent: Aug. 31, 2021

(54) AUTOMATED APPLICATION ERROR RESOLUTION FOR INFORMATION HANDLING SYSTEM

(71) Applicant: Dell Products L.P., Round Rock, TX (US)

(72) Inventors: Alan Abdelhalim, Pflugerville, TX (US); Abu Sanaullah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/661,515

(22) Filed: Oct. 23, 2019

(65) Prior Publication Data

US 2021/0124672 A1 Apr. 29, 2021

(51) Int. Cl.
*G06F 11/36* (2006.01)
*G06F 11/07* (2006.01)
*G06F 8/71* (2018.01)
*G06F 8/65* (2018.01)

(52) U.S. Cl.
CPC .............. *G06F 11/368* (2013.01); *G06F 8/65* (2013.01); *G06F 8/71* (2013.01); *G06F 11/0775* (2013.01); *G06F 11/0787* (2013.01)

(58) Field of Classification Search
CPC . G06F 11/368; G06F 8/65; G06F 8/71; G06F 11/0775; G06F 11/0787
USPC ................................................. 717/124–135
See application file for complete search history.

(56) References Cited

U.S. PATENT DOCUMENTS

| | | | | |
|---|---|---|---|---|
| 9,189,317 | B1* | 11/2015 | Marimuthu | G06F 8/70 |
| 9,519,477 | B2* | 12/2016 | Champlin-Scharff | G06N 5/04 |
| 10,817,362 | B1* | 10/2020 | Bruckner | G06F 16/24573 |
| 2008/0005281 | A1* | 1/2008 | Hsueh | G06F 11/0784 709/219 |
| 2012/0204068 | A1* | 8/2012 | Ye | G06F 11/0769 714/57 |

OTHER PUBLICATIONS

Just, Sascha, Rahul Premraj, and Thomas Zimmermann. "Towards the next generation of bug tracking systems." 2008 IEEE Symposium on Visual Languages and Human-Centric Computing. IEEE, 2008.pp. 82-85 (Year: 2008).*

(Continued)

*Primary Examiner* — Satish Rampuria
(74) *Attorney, Agent, or Firm* — Norton Rose Fulbright US LLP (57) ABSTRACT

A client information handling system may communicate with a remote information handling system to resolve an error encountered by an application of the client information handling system. The remote information handling system may receive an error report and one or more client system parameters from the client information handling system. The remote information handling system may then compare the received error report and received client system parameters with stored error data and associated system parameters detailing occurrence of the error on other information handling systems. The remote information handling system may determine an error resolution based, at least in part, on the comparison and may transmit the error resolution to the client information handling system.

20 Claims, 4 Drawing Sheets

(56) References Cited

OTHER PUBLICATIONS

Strate, Jonathan D., and Phillip A. Laplante. "A literature review of research in software defect reporting." IEEE Transactions on Reliability 62.2 (2013): pp. 444-454. (Year: 2013).*

Cadar, Cristian, et al. "EXE: automatically generating inputs of death." ACM Transactions on Information and System Security (TISSEC) 12.2 (2008): pp. 1-38. (Year: 2008).*

Monperrus, Martin. "Automatic software repair: a bibliography." ACM Computing Surveys (CSUR) 51.1 (2018): pp. 1-24. (Year: 2018).*

Kanawati, Ghani A., Nasser A. Kanawati, and Jacob A. Abraham. "FERRARI: A flexible software-based fault and error injection system." IEEE Transactions on computers 44.2 (1995): pp. 248-260. (Year: 1995).*

Ossher, Joel, Sushil Bajracharya, and Cristina Lopes. "Automated dependency resolution for open source software." 2010 7th IEEE Working Conference on Mining Software Repositories (MSR 2010). IEEE, 2010.pp. 130-140 (Year: 2010).*

\* cited by examiner

AUTOMATED APPLICATION ERROR RESOLUTION FOR INFORMATION HANDLING SYSTEM

FIELD OF THE DISCLOSURE

The instant disclosure relates to information handling system error resolution. More specifically, portions of this disclosure relate to resolution of application errors in information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Operating system (OS) and application updates may be regularly pushed by vendors to improve software executed by information handling systems. Such updates can enhance OS or application stability and security, resolve errors, and/or add new features. For example, OS vendors may push updates regularly in the background, especially under default system settings. These updates can enhance a user experience.

In some cases, OS and/or application updates may change an OS or application in ways that cause applications to encounter errors. For example, an application update may introduce code that conflicts with code of an OS, or an OS update may introduce code that conflicts with code of an Application. Such conflicts may cause errors that may cause the application, the OS, or the information handling system to crash. Application and OS updates may cause errors to occur that did not occur when earlier versions of an application and/or OS were executed. As one example, an application may function properly with a version of an OS executed by an information handling system. An update to the OS may be released, and, when applied, may cause one or more application errors that may cause the application to crash. Such errors may be caused by changes in the OS update, errors in the OS update, longstanding errors in the application code, or other factors. Application and OS errors may negatively impact a user experience and may increase vendor and manufacturer support costs as users may be more likely to contact the manufacturer or vendor in seeking to resolve the errors. It may be difficult for a user to determine a cause of the error. For example, if a user applies numerous updates between uses of the application, it may be difficult for the user to determine which update likely caused the error. If the user is unable to determine the cause of the error, the user may be unable to report the cause to the vendor of the OS or application with specificity.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

When an application error is encountered, a client information handling system may generate an error report including information about the error and may transmit the error report to a remote information handling system, such as a server. The client information handling system may also transmit system parameters including information such as applications and an OS executed by the client information handling system, versions of application executed on the client information handling system, a version of an OS executed by the client information handling system, a list of OS updates installed on the client information handling system, and/or versions of drivers executed by the client information handling system. The server may compare the received error report with stored error data. Such a comparison may be made to determine whether the error detailed in the error report is less likely to occur with one or more application, OS, and/or driver updates, such as software driver updates, applied. Based on the comparison, the server may determine an error resolution and may transmit the error resolution to the client information handling system. For example, the server may determine that an OS or application version of the client information handling system is out of date and that the error has occurred with less frequency in information handling systems running current versions of the OS and/or application. Thus, the server may recommend that the client information handling system update the OS or application associated with the error. The client information handling system may receive and apply the error resolution.

An automated information handling system error resolution system may allow for more rapid error resolution with less user involvement, enhancing a user experience. Furthermore, such a system may reduce the amount of resources a manufacturer or software vendor is required to devote to customer support, by allowing for automated resolution of a variety of errors. Instead of being required to contact customer support or search for and download updates manually with little knowledge of whether the updates will actually resolve the problem, updates to the client information handling system that are likely to resolve the error may be recommended and/or applied automatically, with minimal user and/or technical support involvement.

When an error is encountered by a client information handling system, an error resolution may be recommended by a remote information handling system, such as a server, to resolve the error. A method for resolving a client information handling system error may begin with detecting, by a client information handling system, an error, such as an application error. For example, the application may crash, encounter a hang, or encounter another kind of error.

The information handling system may transmit, to a remote server, a report of the error. For example, the error report may include details as to the cause of the error, an application associated with the error, information for determining culprit binaries that may have caused the error, and other error information. In addition, the client information handling system may also transmit one or more client system parameters of the client information handling system. In some cases, the client system parameters may include applications executed by the client information handling system, an OS executed by the client information handling system, and one or more drivers executed by the client information handling system. The client system parameters may also include versions of the applications, OS, and drivers executed by the client information handling system and details regarding installation of updates to applications, the OS, and drivers such as update names or identifiers and dates of installation. For example, the client system parameters may include a list of one or more OS updates that have been installed on the client information handling system. In some embodiments, the client system parameters may be transmitted on a continuous or regular basis to the server, and not only when an error is encountered, to form a profile for the client information handling system for storage and analysis.

The client information handling system may then receive, from the remote server, an error resolution and may apply the suggested error resolution. For example, the error resolution may include a recommendation to apply one or more updates to an application, the OS, and/or one or more drivers of the client information handling system. Updates may be automatically applied. Alternatively, the client information handling system may request user approval for update application or may instruct a user to manually apply updates.

In some cases, an error resolution may not yet be available. In such cases, the remote server may generate a vendor error report and may transmit the vendor error report to a vendor server for analysis by a vendor of the OS or the application that encountered the error. The client information handling system may receive a notification from the remote server that an error resolution is not yet available but that an error report has been transmitted and may display the notification to a user. The client information handling system may periodically query the remote sever to determine if an error resolution has become available.

A remote information handling system, such as a server, may receive error reports from client information handling systems and may determine whether or not resolutions are available for the errors detailed in the received error reports. A remote information handling system may receive, from a client information handling system, an error report detailing an error of the client information handling system, such as an application error. The remote information handling system may also receive, from the client information handling system, one or more client system parameters of the client information handling system. In some cases, the remote information handling system may create a profile of the client information handling system detailing errors that have been reported and versions of one or more applications, an OS, and one or more drivers that were active on the client information handling system when the error occurred. The remote information handling system may be connected in a cloud configuration to a plurality of remote information handling systems for aggregating information handling system error information and associated client system parameters such as application, OS, and driver versions executed on the client information handling systems and/or OS updates installed when the errors were encountered. The remote information handling system may analyze stored error information and associated system parameters to determine whether specific errors are more or less likely to occur with specific combinations of OS versions, OS updates that have been installed, application versions, and driver versions. For example, the stored error information may include one or more lists of one or more updates installed on other information handling systems and information detailing whether other information handling systems with specific OS updates installed had encountered the error.

The remote information handling system may compare the received error report and received client system parameters with stored error data and associated system parameters detailing occurrence of the error on other information handling systems. For example, the remote information handling system may compare a system profile of the client information handling system with system profiles of other client information handling systems. The remote information handling system may determine whether an application, OS, or driver of the client information handling system is not current. If an application, OS, or driver of the client information handling system is not current, the remote information handling system may use error information and associated system parameters of other client information handling systems to determine whether application of one or more updates to the application, OS, or one or more drivers is likely to resolve the error. As one example, the remote information handling system may determine whether the error is less likely to occur in systems with one or more updates applied. For example, the remote information handling system may search for reported instances of the error in systems operating the application that encountered the error and updated versions of the OS, application, and/or drivers of the client information handling system. If few or no reports of the error are found in systems that have applied one or more application, OS, and/or driver updates, information handling systems with the update(s) applied may be less likely to encounter the error.

The remote information handling system may then determine an error resolution based, at least in part, on the comparison of the received error report and client system parameters with the stored error data and associated system parameters and may transmit the error resolution to the client information handling system. For example, if an update to an application makes occurrence of the error less likely, the error resolution may include a recommendation to apply the update to the application. If an update to the OS makes occurrence of the error less likely, the error resolution may include a recommendation to apply the update to the OS. In some cases, a combination of application, OS, and/or driver updates may be determined to reduce error likelihood. In such cases, multiple updates may be recommended.

In some cases, an error resolution may be unavailable. For example, the applications, OS, and drivers executed by the client information handling system may be current. Alternatively, updates may be shown to be ineffective, as evidenced by high incidence of the same error in systems running current versions of the applications, OS, and/or drivers executed by the client information handling system. In still other cases the remote information handling system may require additional time to analyze the error report and stored error data and associated system parameters. In cases where an error resolution is not available, the remote information handling system may fail to determine an error resolution and may transmit a vendor error report to a vendor error server based, at least in part, on the received error report and the received client system parameters. The vendor error report may have enhanced utility over a user generated error report, as it may include information about the cause and nature of the error than a user is unable to deduce, such as culprit binaries implicated in the error. The remote server may also transmit a notification to the client information handling system that an error resolution is not yet available. The remote server may continue to search for error resolution, analyzing information from systems that have applied updates to the applications, OS, and/or drivers executed by the client information handling system to determine if rates of occurrence of the error decrease. If an effective update is detected, the remote information handling system may push an error resolution to the client information handling system detailing one or more updates that should be applied. In some cases, the remote information handling system may transmit the error resolution only when requested by the client information handling system, rather than pushing the resolution to the client information handling system.

An information handling system may include a memory and a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
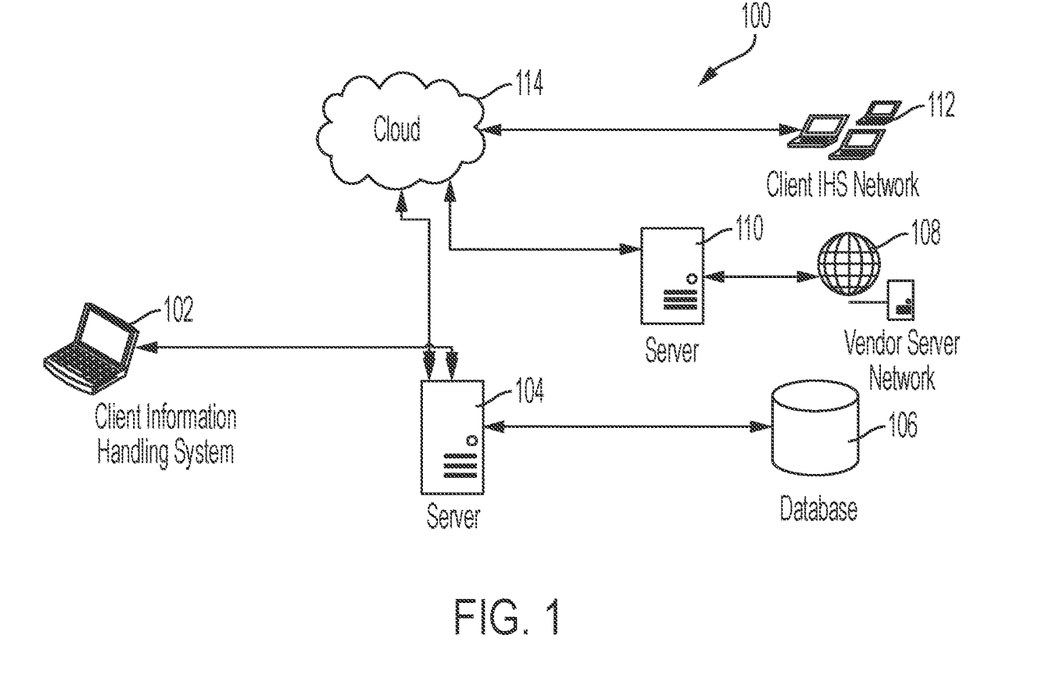
FIG. 1 is a diagram of an example automated information handling system application error resolution system according to some embodiments of the disclosure.

Information handling systems may be networked together to share information. One example topology of a system 100 for automated information handling system error resolution is shown in FIG. 1. A server 104 may be connected to a client information handling system 102 to receive error reports from and provide error resolutions to the client information handling system 102. The server 104 may also receive system parameters from the client information handling system 102, such as a list of applications, an OS, and drivers executed by the client information handling system, versions of the applications, the OS, and the drivers, a list of OS updates that have been installed and dates of installation of the updates, and other system information. The client information handling system 102 may periodically, or upon user instruction, query the server 104 for error resolutions, such as resolutions for errors that cause one or more applications of the client information handling system 102 to crash. For example, the client information handling system may experience multiple crashes over a period of time, and the server 104 may transmit a report detailing the reported crashes and suggested error resolutions to resolve the crashes. The server 104 may receive multiple error reports from multiple client information handling systems. The server 104 may queue, schedule, and optimize data mining and analytics tasks related to resolution of the errors, and may provide determined resolutions in the future, when queried by the client information handling system 102.

The server 104 may apply data mining algorithms, such as statistical procedure algorithms, machine learning algorithms, neural network algorithms, classification algorithms, ID3 algorithms, C4.5 algorithms, K nearest neighbors algorithms, support vector machine algorithms, artificial neural network algorithms, naïve Bayes algorithms, a 48 decision tree algorithm, and a sense cluster algorithm, to analyze data and determine error resolutions. For example, the server 104 may determine updates to applications, an OS, and/or drivers executed by the client information handling system 102 that are likely to resolve the error. The server 104 may then transmit the error resolution to the client information handling system 102. In some cases, the client information handling system 102 may apply the error resolutions automatically. Alternatively or additionally, the client information handling system 102 may display suggested error resolutions to a user via a graphical user interface and request a confirmation that the user would like to apply the updates before applying the updates.

The server 104 may further connect to a cloud 114 on which a variety of error information and system parameters for other information handling systems is stored. The cloud 114 may be comprised of one or more servers for storing and, in some cases, analyzing information handling system error data and client information handling system parameters. For example, a network of client information handling systems 112 may be connected to the cloud 114 to transmit client information handling system error reports and client information handling system parameters to one or more servers of the cloud 114. The cloud 114 may aggregate client information handling system error information and associated client information handling system parameters for systems of the client information handling system network 112. The cloud 114 may also aggregate OS, application, and driver update information. For example, a server 110 such as an update information ingestion server may collect update information from OS or application vendor servers 108 as the information is made available. The update information may include names of updates, publishers of updates, the date of publication, and other information related to the updates made available by the vendors. The server 110 may periodically upload detailed update data to the cloud 114. In some embodiments, the cloud 114 may further aggregate OS update payloads made available by vendors.

The server 104 may retrieve stored client information handling system error information and system parameters associated with the stored parameters form the cloud 114 to analyze the stored data. For example, the server 104 may analyze the error data and system parameters to determine system configurations that are more or less prone to specific errors. As one example, the server 104 may receive an error report from the client information handling system 102 detailing a crash of an application executed by the client information handling system 102. The server 104 may then access error information and associated system parameters stored in the cloud to determine if the error is less likely to occur when specific application, OS, and/or driver updates, or specific combinations of such updates are applied to an information handling system. For example, the server 104 may determine crash incidence rates for various software update combinations based on error information and system parameters stored in the cloud 114. The server 114 may employ data mining capabilities to make such a determination. The server 104 may store results of error occurrence analysis in a database 106 for retrieval if similar errors are reported in the future.

Figure 2:
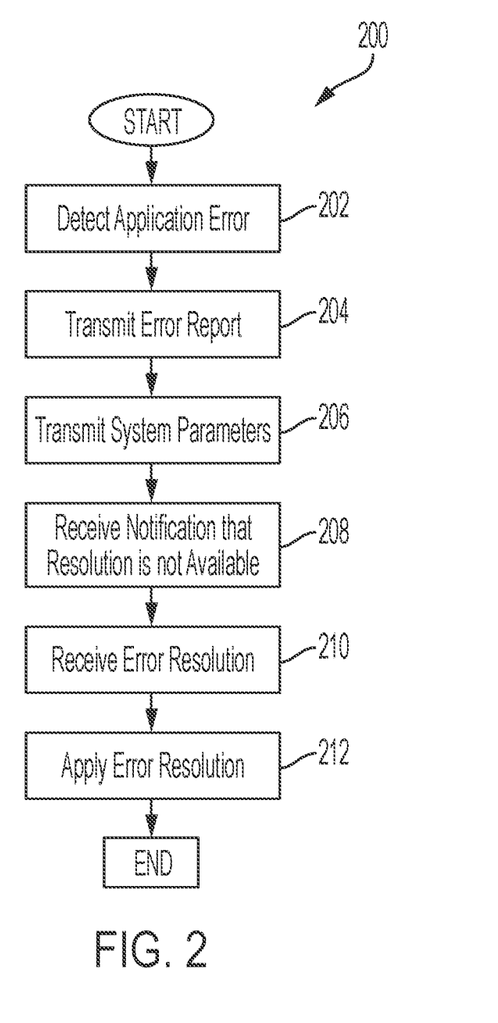
FIG. 2 is a flow chart of an example method for reporting and resolving an information handling system error according to some embodiments of the disclosure.

A client information handling system may notify a remote information handling system, such as a server, of an error and may receive an error resolution from the server. An example method 200 for error reporting and resolution is shown in FIG. 2. The method 200 may begin, at step 202, with detecting an application error. For example, an application of the client information handling system may crash, hang, or encounter another kind of error.

At step 204, the client information handling system may transmit an error report to the remote information handling system. The error report may, for example, include information detailing the type of error encountered, the application that encountered the error, information detailing any drivers that contributed to the error, information for determining culprit binaries of the OS that may have caused the error, a stack trace involved in the error, and other error information.

At step 206, the client information handling system may transmit one or more client information handling system parameters to the remote information handling system. For example, the client system parameters may include a list of applications executed on the client information handling system, an OS executed by the client information handling system, and one or more drivers executed by the information handling system. The client system parameters may also include versions of the applications, OS, and drivers executed by the client information handling system. Application, OS, and driver update information, such as update titles, version information, when the updates became available, when the updates were applied to the client information handling system, and binaries included in the updates may also be included in client information handling system parameters. For example, a list of operating system updates installed by the client information handling system may be included in the client information handling system parameters. The client system parameters may be transmitted when an error is detected and an error report is transmitted. In such cases the client system parameters may be associated with the error report by the remote information handling system and logged to improve future error resolution. Alternatively or additionally, client system parameters may be transmitted to the remote server continuously or at a set interval. The client system parameters may be stored even when an error is not reported, and may be used to determine that certain OS and application version combinations are less likely to encounter specific errors.

At step 208, the client information handling system may receive a notification that a resolution to the error is not currently available. The client information handling system may also receive a notification that an error report has been transmitted to a vendor of the OS of the client information handling system and/or a vendor of the application that encountered the error. The client information handling system may display, via a graphical user interface, a notification to a user that a resolution to the error is not yet available and that an error report has been transmitted to an OS or application vendor. In some embodiments, the client information handling system may then periodically query the server to determine if an error resolution has become available. Alternatively or additionally, the remote server may push a resolution to the client information handling system when the error resolution becomes available. If an error resolution is available when the error report is transmitted to the server, step 208 may be skipped.

At step 210, the client information handling system may receive the error resolution. The error resolution may, for example, include one or more OS, application, and/or driver updates that are likely to resolve the error. At step 212, the client information handling system may apply the error resolution. In some embodiments the client information handling system may display, via a graphical user interface, a list of suggested updates to a user and may request user approval before applying the updates.

Figure 3:
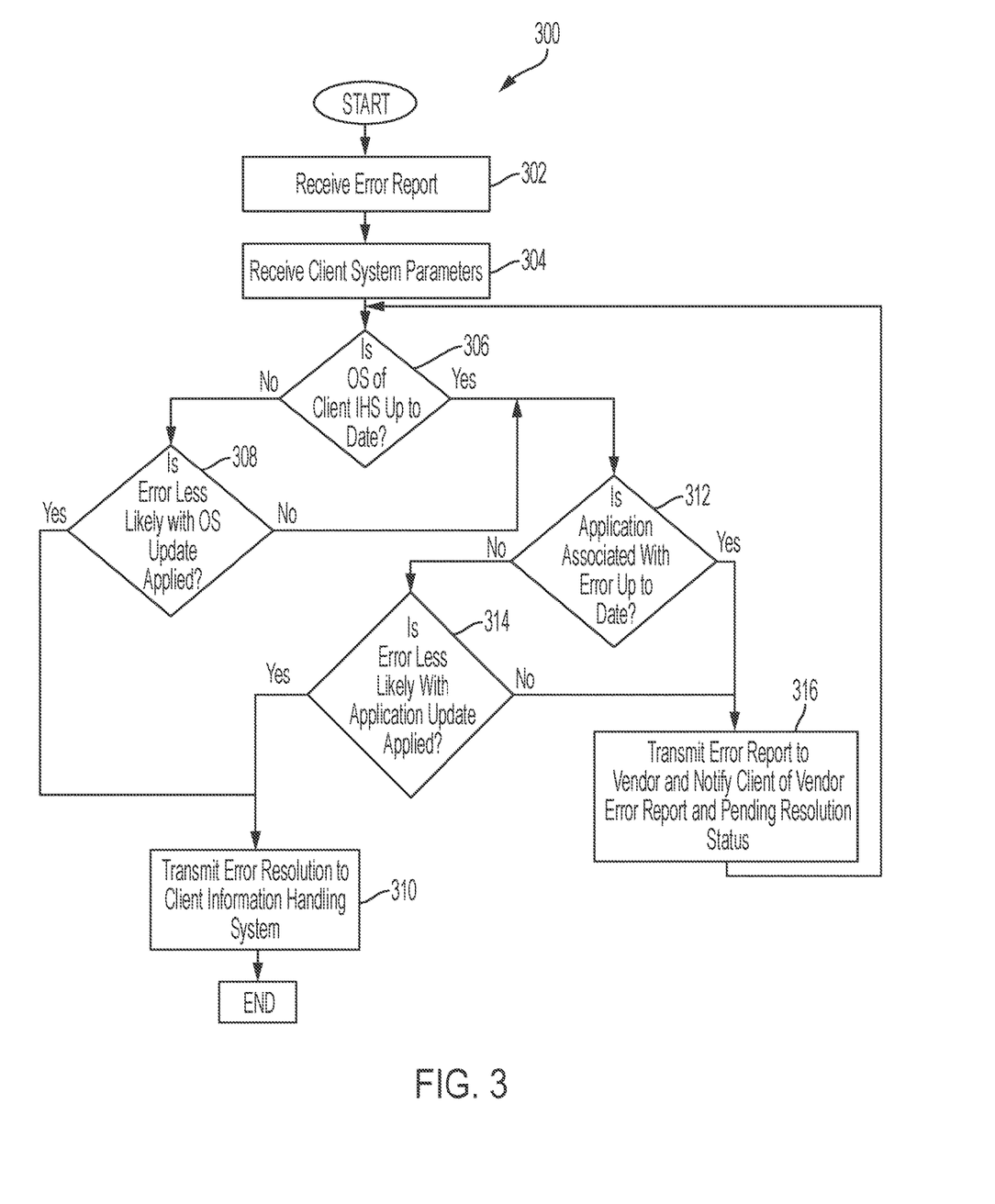
FIG. 3 is a flow chart of an example method for determining an error resolution based on reported error information according to some embodiments of the disclosure.

A remote information handling system, such as a server, may receive client information handling system error reports and may determine error resolutions. A method 300 for determining a resolution to an error is shown in FIG. 3. The method 300 may begin, at step 302 with receipt of an error report. For example, a server may receive an error report from a client information handling system. In some embodiments, the server may be configured to receive multiple error reports from multiple information handling systems.

At step 304, the remote information handling system may receive one or more client information handling system parameters. In some embodiments, the remote information handling system may store error information from the received error report and associated system parameters. For example, the remote information handling system may store error information for a particular error associated with a version of the OS, one or more particular OS updates, a version of the application, and a version of drivers executed by the client information handling system when the error occurred. The remote information handling system may also store system parameters that are received from client information handling systems that do not accompany error reports.

At step 306, the remote information handling system may determine whether the OS executed by the client information handling system when the client information handling system encountered the error is up to date. In some embodiments, the information handling system may also determine whether one or more drivers executed by the client information handling system are current. The remote information handling system may collect information on OS updates from OS vendor update servers. Alternatively or additionally, the remote information handling system may collect client system parameters from other client information handling systems including information on OS updates, such as update names, versions, date of availability, binaries involved, and other OS update information. The remote information handling system may compare an OS version, or update, received in client system parameters from the client information handling system with update information received from the OS vendor servers and/or other client information handling systems to determine if the OS executed on the client information handling system is current. In some embodiments, the remote information handling system may search for OS updates that include more recent versions of culprit binaries that caused the application error.

If the OS is not current, the remote information handling system may determine, at step 308, whether an error is less likely to occur when one or more updates to the OS are applied. For example, the remote information handling system may apply data mining algorithms to error information and associated system parameters stored for other client information handling systems to determine if information handling systems running an updated version of the OS are less likely to encounter the error than information handling systems running the version of the OS executed by the client information handling system. For example, the remote information handling system may search for a zero, or much lower, incidence rate for the reported error associated with updated versions of the OS. If multiple OS updates are available, the remote information handling system may determine a likelihood of encountering the reported error for each of the available updates.

If an error is less likely to occur in systems that have applied one or more OS updates, the remote information handling system may, at step 310, transmit the error resolution to the client information handling system. For example, the remote information handling system may transmit a list of OS updates to be installed by the client information handling system. In some embodiments, the remote information handling system may store the error resolution with error information from the reported error in a database of error analysis results. The remote information handling system may then transmit the error resolution to the client information handling system when queried by the client information handling system. In some embodiments, before transmitting the error resolution, the remote information handling system may determine whether the application associated with the error is up to date and, if not, whether an update to the application would further reduce the likelihood of the error. If application updates would further reduce likelihood of the error, the application updates may also be added to a list of updates to be transmitted to the client information handling system in the error resolution.

If the OS of the client information handling system is current, or updates to the OS are determined to be ineffective at resolving the error, the remote information handling system may determine, at step 312, whether an application associated with the error is up to date. In some embodiments, the remote information handling system may collect information from application vendor update servers on application updates. Alternatively or additionally, the remote information handling system may collect client system parameters from other client information handling systems including information on application updates, such as update names, versions, date of availability, and other application update information. For example, a Dell® Data Vault software inventory may be examined to determine updates to the application have been released that have not been applied to the application on the client information handling system. The remote information handling system may then compare an application version received in client system parameters from the client information handling system with update information received from the application vendor servers and/or other client information handling systems to determine if the application executed on the client information handling system is current. In some cases, the remote information handling system may determine whether the application is current and whether an application update should be applied before determining whether the OS is current.

If the application associated with the error is not up to date, the remote information handling system may, at step 314 determine whether the reported error is less likely to occur with the application update applied. For example, the remote information handling system may apply data mining algorithms to error information and associated system parameters stored for other client information handling systems to determine if information handling systems running the current version of the application are less likely to encounter the error than information handling systems running the version of the application executed by the client information handling system. For example, the remote information handling system may search for a zero, or much lower, rate of incidence of the error associated with updated versions of the application. If multiple application updates are available, the remote information handling system may determine a likelihood of encountering the reported error for each of the available updates.

If an error is less likely with one or more application updates applied, the remote information handling system may, at step 310, transmit the error resolution to the client information handling system. For example, the error resolution may include a list of application updates to be installed by the client information handling system that reduce the likelihood of the error. In some embodiments, the remote information handling system may store the error resolution with error information from the reported error in a database of error analysis results for use if the same error is reported from different client information handling systems in the future. The remote information handling system may then transmit the error resolution to the client information handling system automatically or when queried by the client information handling system.

If the OS and the application executed by the client information handling system are both current, or if an update to either the OS or application is unlikely to reduce the likelihood of the error occurring again, the remote information handling system may, at step 316, transmit an error report to a vendor of the OS and/or application and may notify the client information handling system of transmission of the vendor error report and lack of available error resolution. For example, the client information handling system may transmit an error report to an error receipt server operated by a vendor of the OS and/or application detailing the error encountered by the client information handling system and the system parameters of the client information handling system associated with the reported error. The method 300 may then proceed back to step 306 of determining if the OS of the client information handling system is up to date. When an OS or application update is released that resolves the error, as evidenced by reduced error incidence in information handling systems with the update applied, the remote information handling system may transmit the error resolution to the client information handling system automatically, or upon a query from the client information handling system.

Figure 4:
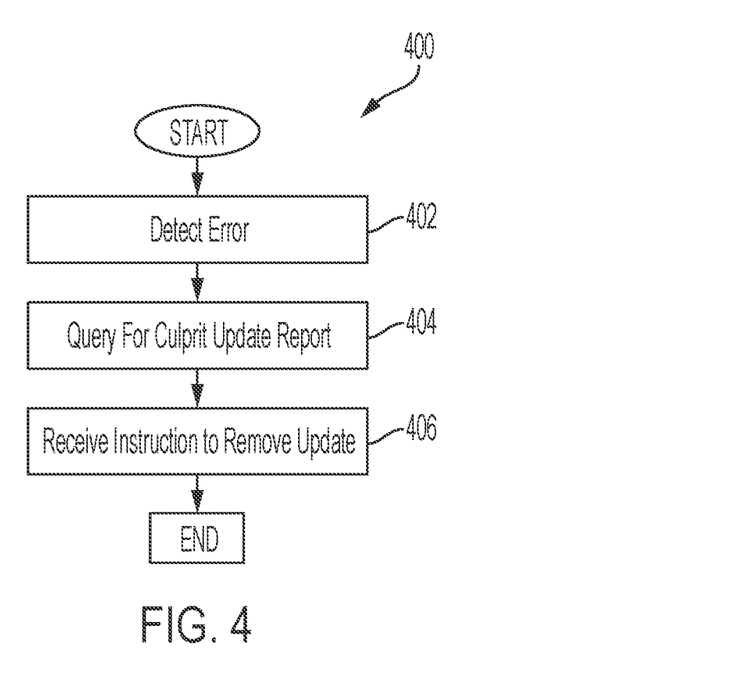
FIG. 4 is flow chart of an example method for rolling back an information handling system status according to some embodiments of the disclosure.

In some situations, it may be desirable to roll back an update to an operating system or application, as described in U.S. patent application Ser. No. 16/385,792, which is incorporated herein by reference. For example, if a severe error is encountered and no application or OS updates are available that resolve the error, it may be desirable to roll back a version of the OS or application to resolve the error temporarily. After one or more updates to the OS and/or application resolving the error are released, the application and/or OS may be restored to a current version. FIG. 4 shows an example method 400 for removing an update that may have caused an error. The method 400 may begin, at step 402 with detection of an error by a client information handling system. After an error is detected, the client information handling system may, at step 404, query a remote information handling system, for a culprit update report detailing updates that may be the cause of the error. At step 406, the client information handling system may receive an instruction from the remote information handling system to remove one or more application or OS updates. The client information handling system may then present a list of potential culprit updates to the user, to allow the user to select one or more updates to roll back. In some embodiments, the client information handling system may automatically roll back one or more updates.

The schematic flow chart diagrams of FIGS. 2-4 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method, comprising:
    receiving, from a client information handling system, an error report detailing an application error of the client information handling system;
    receiving, from the client information handling system, one or more client system parameters of the client information handling system, wherein the one or more client system parameters of the client information handling system include a version of an operating system of the client information handling system;
    determining that one or more updates to the operating system are available and have not yet been applied to the operating system of the client information handling system based, at least in part, on the version of the operating system of the client information handling system,
    comparing the received error report and received client system parameters with a plurality of sets of stored error data and associated system parameters received from a plurality of other information handling systems detailing occurrence of the application error on the plurality of other information handling systems, wherein comparing the received error report and received client system parameters with stored error data and associated system parameters comprises determining that the application error occurs less frequently in systems wherein at least one of the determined one or more updates to the operating system is applied;

determining an error resolution based, at least in part, on the comparison; and transmitting the error resolution to the client information handling system.

2. The method of claim 1, further comprising:

failing to determine an error resolution based, at least in part, on the comparison;

transmitting a vendor error report based, at least in part, on the received error report and the received one or more client system parameters to a vendor server; and transmitting a notification to the client information handling system that an error resolution is not yet available.

3. The method of claim 1, wherein comparing the received error report and received client system parameters with stored error data and associated system parameters comprises applying one or more data mining algorithms to the stored error data and associated system parameters.

4. The method of claim 1, wherein the received client system parameters further comprise at least one of: a list of operating system updates applied to the operating system of the client information handling system, or a version of an application executed by the client information handling system and associated with the error report, and wherein the associated system parameters of the stored error data comprise at least one of: versions of the operating system executed on the other information handling systems, operating system updates applied to the other information handling systems, or versions of the application executed on the other information handling systems.

5. The method of claim 4, further comprising:

determining that one or more updates to the application are available and have not yet been applied to the application of the client information handling system, wherein the step of comparing the received error report and received client system parameters with stored error data and associated system parameters comprises determining that the error occurs less frequently in systems running an updated version of the application.

6. The method of claim 5, wherein the step of determining an error resolution comprises determining that an update to the application should be applied based on the determination that the error occurs less frequently in systems running the updated version of the application, and wherein the step of transmitting the error resolution comprises transmitting an instruction to the client information handling system to update the application.

7. The method of claim 1, wherein the step of determining an error resolution comprises determining that the at least one of the determined one or more updates to the operating system should be applied based on the determination that the error occurs less frequently in systems wherein at least one of the determined one or more updates to the operating system is applied, and wherein the step of transmitting the error resolution comprises transmitting an instruction to the client information handling system to apply one of the one or more updates to the operating system of the client information handling system.

8. The method of claim 1, wherein comparing the received error report and received client system parameters with stored error data and associated system parameters comprises determining that the application error occurs less frequently in systems where at least one update that has been applied to the operating system of the client information handling system is not applied, wherein determining an error resolution comprises determining that the at least one update that has been applied to the operating system of the client information handling system should be removed, and wherein transmitting the error resolution to the client information handling system comprises instructing the client information handling system to remove the at least one update that has been applied to the operating system of the client information handling system.

9. An information handling system comprising:

a processor; and a memory, wherein the processor is configured to perform steps comprising:

receiving, from a client information handling system, an error report detailing an application error of the client information handling system;

receiving, from the client information handling system, one or more client system parameters of the client information handling system, wherein the one or more client system parameters of the client information handling system include a version of an operating system of the client information handling system;

determining that one or more updates to the operating system are available and have not yet been applied to the operating system of the client information handling system based, at least in part, on the version of the operating system of the client information handling system;

comparing the received error report and received client system parameters with a plurality of sets of stored error data and associated system parameters received from a plurality of other information handling systems detailing occurrence of the application error on the plurality of other information handling systems, wherein comparing the received error report and received client system parameters with stored error data and associated system parameters comprises determining that the application error occurs less frequently in systems wherein at least one of the determined one or more updates to the operating system is applied;

determining an error resolution based, at least in part, on the comparison; and transmitting the error resolution to the client information handling system.

10. The system of claim 9, wherein the processor is further configured to perform steps comprising:

failing to determine an error resolution based, at least in part, on the comparison;

transmitting a vendor error report based, at least in part, on the received error report and the received one or more client system parameters to a vendor server; and transmitting a notification to the client information handling system that an error resolution is not yet available.

11. The system of claim 9, wherein comparing the received error report and received client system parameters with stored error data and associated system parameters comprises applying one or more data mining algorithms to the stored error data and associated system parameters.

12. The system of claim 9, wherein the received client system parameters further comprise at least one of: a list of operating system updates applied to the client information handling system, or a version of an application executed by the client information handling system and associated with the error report, and wherein the associated system parameters of the stored error data comprise at least one of: versions of the operating system executed on the other information handling systems, operating system updates applied to the other information handling systems, or versions of the application executed on the other information handling systems.

13. The system of claim 12, wherein the processor is further configured to perform steps comprising:
determining that one or more updates to the application are available and have not yet been applied to the application of the client information handling system, wherein the step of comparing the received error report and received client system parameters with stored error data and associated system parameters comprises determining that the error occurs less frequently in systems running an updated version of the application.

14. The system of claim 13, wherein the step of determining an error resolution comprises determining that an update to the application should be applied based on the determination that the error occurs less frequently in systems running the updated version of the application, and wherein the step of transmitting the error resolution comprises transmitting an instruction to the client information handling system to update the application.

15. The system of claim 9, wherein the step of determining an error resolution comprises determining that the at least one of the determined one or more updates to the operating system should be applied based on the determination that the error occurs less frequently in systems wherein the at least one of the determined one or more updates to the operating system is applied, and wherein the step of transmitting the error resolution comprises transmitting an instruction to the client information handling system to apply the one or more updates to the operating system of the client information handling system.

16. The apparatus of claim 9, wherein comparing the received error report and received client system parameters with stored error data and associated system parameters comprises determining that the application error occurs less frequently in systems where at least one update that has been applied to the operating system of the client information handling system is not applied, wherein determining an error resolution comprises determining that the at least one update that has been applied to the operating system of the client information handling system should be removed, and wherein transmitting the error resolution to the client information handling system comprises instructing the client information handling system to remove the at least one update that has been applied to the operating system of the client information handling system.

17. A computer program product, comprising:
a non-transitory computer readable medium comprising instructions to perform steps comprising:
receiving, from a client information handling system, an error report detailing an application error of the client information handling system;
receiving, from the client information handling system, one or more client system parameters of the client information handling system, wherein the one or more client system parameters of the client information handling system include a version of an operating system of the client information handling system;
determining that one or more updates to the operating system are available and have not yet been applied to the operating system of the client information handling system based, at least in part, on the version of the operating system of the client information handling system;
comparing the received error report and received client system parameters with a plurality of sets of stored error data and associated system parameters received from a plurality of other information handling systems detailing occurrence of the application error on the plurality of other information handling systems, wherein comparing the received error report and received client system parameters with stored error data and associated system parameters comprises determining that the application error occurs less frequently in systems wherein at least one of the determined one or more updates to the operating system is applied;
determining an error resolution based, at least in part, on the comparison; and
transmitting the error resolution to the client information handling system.

18. The computer program product of claim 17, wherein the received client system parameters further comprise at least one of: a list of operating system updates applied to the client information handling system, or a version of an application executed by the client information handling system and associated with the error report, and wherein the associated system parameters of the stored error data comprise at least one of: versions of the operating system executed on the other information handling systems, operating system updates applied to the other information handling systems, or versions of the application executed on the other information handling systems.

19. The system of claim 18, wherein the non-transitory computer readable medium comprising instructions to perform steps further comprising:
determining that one or more updates to the application are available and have not yet been applied to the application of the client information handling system, wherein the step of comparing the received error report and received client system parameters with stored error data and associated system parameters comprises determining that the error occurs less frequently in systems running an updated version of the application.

20. The computer program product of claim 17, wherein comparing the received error report and received client system parameters with stored error data and associated system parameters comprises determining that the application error occurs less frequently in systems where at least one update that has been applied to the operating system of the client information handling system is not applied, wherein determining an error resolution comprises determining that the at least one update that has been applied to the operating system of the client information handling system should be removed, and wherein transmitting the error resolution to the client information handling system comprises instructing the client information handling system to remove the at least one update that has been applied to the operating system of the client information handling system.

\* \* \* \* \*